United States Patent
Schiffers et al.

(10) Patent No.: US 11,213,986 B2
(45) Date of Patent: Jan. 4, 2022

(54) METHOD FOR DETERMINING AN ACTUAL VOLUME OF AN INJECTION MOLDABLE COMPOUND IN AN INJECTION MOLDING PROCESS

(71) Applicant: KRAUSSMAFFEI TECHNOLOGIES GMBH, Munich (DE)

(72) Inventors: Reinhard Schiffers, Duisburg (DE); Stefan Moser, Hallbergmoos (DE); Stefan Kruppa, Munich (DE); Matthias Busl, Karlsfeld (DE)

(73) Assignee: KraussMaffei Technologies GmbH, Munich (DE)

(*) Notice: Subject to any disclaimer, the term of this patent is extended or adjusted under 35 U.S.C. 154(b) by 299 days.

(21) Appl. No.: 15/765,157

(22) PCT Filed: Oct. 5, 2016

(86) PCT No.: PCT/EP2016/073737
§ 371 (c)(1),
(2) Date: Mar. 30, 2018

(87) PCT Pub. No.: WO2017/060270
PCT Pub. Date: Apr. 13, 2017

(65) Prior Publication Data
US 2018/0272586 A1    Sep. 27, 2018

(30) Foreign Application Priority Data

Oct. 9, 2015  (DE) .................... 10 2015 117 237.2

(51) Int. Cl.
*B29C 45/76*    (2006.01)
(52) U.S. Cl.
CPC ............ *B29C 45/766* (2013.01); *B29C 45/76* (2013.01); *B29C 45/762* (2013.01);
(Continued)

(58) Field of Classification Search
CPC ......... B29C 45/00; B29C 45/76; B29C 45/77; B29C 2945/76933; B29C 45/766;
(Continued)

(56) References Cited

U.S. PATENT DOCUMENTS 4,816,197 A * 3/1989 Nunn ...................... B29C 45/76
264/40.1
5,260,010 A    11/1993 Yokota
(Continued)

FOREIGN PATENT DOCUMENTS

DE          36 08 973      9/1987
DE    10 2005 016 617      12/2006
(Continued)

OTHER PUBLICATIONS

Wikipedia "adiabatic process" (https://en.wikipedia.org/w/index.php?title=Adiabatic_process&direction=next&oldid=650993933) Last updated date: Mar. 13, 2015. (Year: 2015).*
(Continued)

*Primary Examiner* — Leith S Shafi
*Assistant Examiner* — Inja Song
(74) *Attorney, Agent, or Firm* — Henry M. Feiereisen LLC (57) ABSTRACT

A method for determining an actual volume Vr of an injection-moldable compound during an injection-molding process is disclosed. The injection-moldable compound is introduced into at least one cavity of the mould. The method includes the steps of: a) determining a theoretical volume Vt from process variables at least during a filling phase of the injection-molding process, b) determining and/or measuring at least one value for at least one compound pressure pM, c) selecting a material-specific compression k (p), corresponding to the value of pM, of the injection-moldable compound,
(Continued)

and d) calculating an actual volume Vr by taking into account the compression k (p).

14 Claims, 5 Drawing Sheets

(52) U.S. Cl.
CPC .......... B29C 2945/7619 (2013.01); B29C 2945/76107 (2013.01); B29C 2945/76257 (2013.01); B29C 2945/76381 (2013.01); B29C 2945/76498 (2013.01); B29C 2945/76545 (2013.01); B29C 2945/76859 (2013.01); B29C 2945/76933 (2013.01)

(58) Field of Classification Search
CPC ........ B29C 45/762; B29C 2945/76107; B29C 2945/7619; B29C 2945/76257; B29C 2945/76381; B29C 2945/76498; B29C 2945/76545; B29C 2945/76859; B29C 2945/76939
See application file for complete search history.

(56) References Cited

U.S. PATENT DOCUMENTS

| | | | |
|---|---|---|---|
| 6,051,170 A * | 4/2000 | Kamiguchi | G05B 19/40937 264/40.1 |
| 6,514,440 B1 * | 2/2003 | Kazmer | B29C 45/1753 264/328.8 |
| 2003/0071382 A1 | 4/2003 | Neal | |
| 2006/0082009 A1 * | 4/2006 | Quail | B22D 17/007 264/40.1 |
| 2016/0229101 A1 | 8/2016 | Schiffers | |
| 2016/0250791 A1 | 9/2016 | Schiffers et al. | |
| 2016/0332342 A1 * | 11/2016 | Pillwein | B29C 45/76 |
| 2016/0346979 A1 * | 12/2016 | Uchiyama | B29C 45/7686 |

FOREIGN PATENT DOCUMENTS

| | | |
|---|---|---|
| DE | 10 2007 030 637 | 1/2009 |
| DE | 10 2013 111 257 | 8/2014 |
| DE | 10 2013 111 328 | 4/2015 |
| EP | 1 074 374 | 2/2001 |
| JP | 1-146718 | 6/1989 |
| JP | 2006-116920 | 5/2006 |
| WO | WO 9941057 * | 8/1999 |
| WO | WO 02/051615 | 7/2002 |

OTHER PUBLICATIONS

International Search Report issued by the European Patent Office in International Application PCT/EP2016/073737.

* cited by examiner

METHOD FOR DETERMINING AN ACTUAL VOLUME OF AN INJECTION MOLDABLE COMPOUND IN AN INJECTION MOLDING PROCESS

CROSS-REFERENCES TO RELATED APPLICATIONS

This application is the U.S. National Stage of International Application No. PCT/EP2016/073737, filed Oct. 5, 2016, which designated the United States and has been published as International Publication No. WO 2017/060270 and which claims the priority of German Patent Application, Serial No. 10 2015 117 237.2, filed Oct. 9, 2015, pursuant to 35 U.S.C. 119(a)-(d).

BACKGROUND OF THE INVENTION

The invention relates to a method for determining an actual filling volume of a cavity of an injection mold comprising an injection-moldable compound.

Injection molding machines allow movements of all axes and drives with a very high precision. In particular the translatory screw movement for introducing e.g. molten thermoplastics (melts) into a cavity of a mold is regulated to a large extent and can be reproduced in particular in the case of electrical injection molding machines. Non-machine-related fluctuations, e.g. environmental fluctuations and start-up effects, however, have a negative impact on the reproducibility of an injection molding process in response to the production of injection molded parts. The approach commonly used in the prior art for stabilizing the molded part quality is to keep temperatures, accelerations (of the screw), speeds, etc. as constant as possible throughout the production time.

These measures, however, cannot always compensate for fluctuations or changes, which occur in the material, the temperature environment of the machine or other externally occurring or mechanical-physical effects (such as, e.g. granule collection or effects of the non-return valve). In spite of process control, which is always identical, these fluctuations or changes can lead to a different mold filling and thus to a different quality of the molded parts.

To measure and regulate the injection process, the prior art falls back on pure machine variables. For the most part, the speed is kept constant in the injection phase, for example, and the compound pressure in holding pressure phases. In most of the machines, an injection volume can be measured and displayed. However, this is a theoretical injection volume, which results from a simple calculation from the actually performed screw stroke and the screw cross section area. In this respect, the injection volume used in the prior art is to thus be considered to be a theoretical volume. An actually existing compressibility of the used injection-moldable material, however, is not considered.

It is known from DE 10 2007 030 637 B4 to measure the material compressibility of a melt and to use it to determine a mixing ratio of two material components or to consider it hereby.

It is known from DE 10 2005 016 617 B1 to adapt a holding pressure time, wherein the injection molding process is controlled by means of the decrease of a plastic volume flow. The plastic volume flow is also determined from the screw stroke here and thus corresponds to the theoretical volume, which can be compressed to different degrees during the holding pressure phase, depending on the pressure level.

A so-called expansion injection molding process is known from EP 1 074 374 A1, in which the compressibility of the melt is used to fill a cavity of the mold. A compressed melt volume is guided into the cavity of a mold during the relaxation process (decompression) and is relaxed hereby. However, an active filling, for example by a displacement of the screw, does not take place. So that a complete mold filling occurs, the expansion volume needs to correspond to the filling volume. In the case of the method known from the above-mentioned publication, an actually introduced volume is neither measured nor is it used to control the machine.

It is known from JP H01-146718 A to use a k-v-t-diagram of the injection molding compound, among others, to estimate a shrinking of a compressed injection compound.

It is known from U.S. Pat. No. 5,260,101 to determine different parameters of the injection molding machine prior to and after the final injection so as to determine a filling weight of a molded part.

A method for controlling the compression phase in response to the injection molding of thermoplastic molding compounds is known from DE 36 08 973 A1, wherein a compression pressure is exerted beyond a holding time via a volumetric filling of the mold. This effects a subsequent compound delivery into the mold until the runner mold is sealed. If necessary, it is proposed to effect the sealing by means of a runner mold closing member, which is provided specifically for this purpose.

A method for assessing procedural properties of injection molds is known from DE 10 2013 111 328 A1. A qualitative categorization of the filling behavior of injection molds hereby occurs by means of characteristic values, which are determined in the context of a learning cycle.

An effort to keep the filling volume as constant as possible in an injection molding process is known from DE 10 2013 111 257 B3. This in consideration of machine-external fluctuations, such as, for example, a hall temperature, fluctuation of the material to be processed, and other parameters, which influence the viscosity of the material.

In the described method, a molded part volume equivalent is defined, which is held constant by adapting the switch-over point. This measured variable is formed from the division of a melt flow index and an average viscosity. The melt flow index is a pressure integral during the entire or a portion of the injection process. The viscosity is formed from the average pressure in a portion of the filling phase as well as from the average speed in this area. The holding pressure level is adapted as a function of the viscosity change relative to a reference in a learning process.

In the prior art, none of the proposed solutions currently measures or regulates the volume of the molding compound, i.e. a compound, which is injection-moldable in some way, which is to be introduced into a cavity of a mold. The compressibility of injection-moldable compounds, whether thermoplastic melts or thermosetting plastics, silicones, varnishes or the like, is essentially not considered to ensure a correct mold filling.

For example, a display and a control via the theoretical volume and the theoretical volume flow, which was determined up to now from geometric boundary conditions, such as, e.g., the screw diameter and the screw stroke are susceptible to compression. This means that, for example when the screw is moved from a volume of 100 cm$^3$ at a pressure of 1 bar to a position of 60 cm$^3$ at a compound pressure of 1000 bar, the filling volume (and thus also the filling compound) in the mold is different than when the compound pressure only rises to 500 bar. It should be pointed out in an exemplary manner that in the case of a theoretical compressibility of 5% per 1000 bar of compound pressure, a volume of 63.1 cm³ is present in the screw antechamber in the first case after pressure relaxation, in the second case only a volume of 61.5 cm³ is present in the screw antechamber. This means that in the second case, 1.6 cm³ more of uncompressed melt was introduced into the cavity. This is illustrated schematically in FIG. 1. If the injection process is thus ended with the same volume or equivalent with the same screw stroke, different molded part compounds are introduced at different pressures. Pressure differences, however, appear as a result of temperature fluctuations and viscosity changes of the material and thus impact the component quality and the constant weight of the finished molded part.

As already explained above, a molded part volume is measured in DE 10 2013 111 257 B3. However, this does not occur directly, but indirectly via the "molded part volume equivalent".

This "molded part volume equivalent" is also used to determine the holding pressure switch-over point. The method explicitly requires a similar compound pressure curve progression.

An "interference" in the form of a plastification or machine change, respectively, would also be an application for an adaptive process control. This requires in particular an independence of the measured values from the screw diameter. This characteristic is not present in response to the determination of the melt flow index via the pressure integral via the injection time and thus the molded part volume equivalent.

SUMMARY OF THE INVENTION

It is thus the object of the invention to specify a method for determining an actual volume of an injection-moldable compound during an injection molding process. In addition, such a method is to ensure that the component quality, in particular the component volume and the mold filling can be kept constant to a particular extent. In addition, it is to be ensured that the same mold can be transferred to a different injection molding machine with reduced, in particular with highly reduced retracting effort, simply based on characteristic variables of an injection molding machine, and that said injection molding machine can be operated in a cost-efficient manner with this mold.

These objects are solved by a method for determining an actual volume $V_r$ of an injection-moldable compound during an injection molding process, wherein the injection-moldable compound is introduced into at least one cavity of the mold, with the method having the following steps:

a) determining a theoretical volume $V_t$ from process variables at least during a filling phase of the injection molding process, b) determining and/or measuring at least one value for at least one compound pressure $p_M$.

Such a method is further developed according to the invention by the steps:

c) selecting a material-specific compression k(p), corresponding to the value of $p_M$, of the injection-moldable compound, and d) calculating an actual volume $V_r$ by taking into account the compression k(p).

Advantageous embodiments are specified in the subclaims.

In the case of the method according to the invention, an, actually present compression of the injection-pourable compound under pressure is now used for the first time as being relevant for the determination of an actual volume $V_r$ during an injection molding during. Using the invention, it is thus possible for the first time to keep mold fillings constant across several injection molding processes, but to at least significantly homogenize it as compared to the prior art, because it has been recognized that the compression of the injection-moldable material has significant influence on the filling of the cavity in the mold and thus has impacts on the component quality. For explanation purposes, it is stated that the term "filling phase", as it is used in the above-mentioned feature a) and in the entire application, is to be understood to be the injection phase and the holding pressure phase of an injection molding process, thus the entire time period, in which molding compound reaches into a cavity.

In an advantageous embodiment of the method according to the invention, an adaptation of machine parameters of the injection molding machine is performed, which occurs in such a way that a reaching of an ideal actual filling volume $\Delta V_{ri}$ of the at least one cavity occurs, after the calculation of an actual volume $V_r$, taking into account the compression k(p) (step d) of the method). Such an ideal actual filling volume $\Delta V_{ri}$ leads to a good part, for example, and can be defined as target variable, which is to be reached again and again as accurately as possible, that is, in response to every blast.

In a further advantageous embodiment of the invention, the selection of the material-specific compression k(p) of the injection-pourable compound occurs from a material-specific compression curve k(p), which is stored in a machine controller, in particular from an adiabatic compression curve stored in the machine controller. It is possible to read out the corresponding compression, e.g. in %, for each currently present pressure value $p_M$ from such a material-specific data collection in the injection molding machine, and to thus calculate an actual volume $V_r$.

It has proved its worth to use a compound pressure as compound pressure $p_M$, for example in a cylinder or an internal mold pressure of the molding compound (injection-moldable compound) or a molding compound pressure in the screw antechamber. Advantageously, at least two values A and B of the compound pressure $p_M$ are determined and/or measured during a defined process window. The two values A and B are preferably measured by an identical compound pressure type so as to be able to attain a high comparability or reducibility, respectively.

If necessary, it can also be advantageous to determine the values A and/or B as average values via several individual measured values of the compound pressure $p_M$.

In addition, an actual filling volume $\Delta V_r$, which corresponds to a difference from compression-adjusted volumes $V_{rA}$ and $V_{rB}$ between the positions A and B, can advantageously be calculated according to the formula $$\Delta V_r = \frac{V_{tFB}}{1-k(p_{FB})} - \frac{V_{tFA}}{1-k(p_{FA})} = \frac{V_{tSA}}{1-k(p_{SA})} - \frac{V_{tSB}}{1-k(p_{SB})}$$

Such a compression-adjusted actual filling volume $\Delta V_r$ considers the compressibility of the injection-moldable compound at pressure $p_M$ at different positions A and B, whereby $V_{tFA}$: is a theoretical volume in the mold at the position A $V_{tFB}$: is a theoretical volume in the mold at the position B $V_{tSA}$: is a theoretical volume in the injection unit at the position A $V_{tSB}$: is a theoretical volume in the injection unit at the position B $p_{FB}$: is a molding compound pressure at a position B $p_{FA}$: is a molding compound pressure at a position A $p_{SA}$: is a molding compound pressure in the screw antechamber at the position A $p_{SB}$: is a molding compound pressure in the screw antechamber at the position B.

According to the invention, it has thus been recognized that ratios with regard to the actual filling volumes $\Delta V_r$ within a cavity can be determined to be compression-adjusted, e.g. by means of pressure ratios in the area of a screw antechamber. The pressure values in the screw antechamber ($p_{SA}$ or $p_{SB}$) can be determined significantly more easily and in particular more accurately than pressure ratios within a mold, in particular during the mold filling by means of measuring means, which are present on injection molding machines. It is thus possible to obtain reliable information about an actual filling volume $\Delta V_r$ in the cavity by monitoring the pressure $p_S$ in the screw antechamber.

In the alternative or cumulatively, an actual filling volume flow $\Delta \dot{V}_r$ can also be determined by deriving the actual filling volume $\Delta V_r$ after the time t for a time period, e.g. from the formula $$\Delta \dot{V}_r = \frac{\Delta V r}{t_B - t_A}$$

Instead of the points in time $t_B$ and/or $t_A$, a screw speed $v_S$ can also be used in response to the determination of the actual filling volume flow $\Delta \dot{V}_r$ during the injection process or during the holding pressure phase to calculate the actual filling volume flow $\Delta \dot{V}_r$.

This actual volume flow $\dot{V}_r$ or the actual filling volume $\Delta V_r$ can be compared to a reference curve of an actual filling volume $\Delta V_{rR}$ and/or of an actual volume flow $\dot{V}_{rR}$ during the filling phase. Disruptions in response to the filling of the at least one cavity can thus be identified by a deviation from the reference. If a cascade or hot runner nozzle is closed, e.g., the injection process can thus be discontinued to protect the tool against being damaged.

To increase the accuracy, the additional, constant volume $V_t^*$ can be added for the calculations in addition to every measured theoretical volume $V_t$. Volumes, which are not captured by the screw or piston stroke can thus be considered. These are for example present in a nozzle or a hot runner system.

For a particularly high accuracy and for a particularly good detail observability of an injection process or of an entire production cycle in the injection molding process, it can be advantageous to determine the actual filling volume $\Delta V_r$ during the entire filling process in a continuous manner and/or to influence an injection movement for filling the cavity in such a way that a predetermined volume flow profile is employed. A speed influencing of the screw feed can for example take place as injection movement in the injection phase. A pressure control or a pressure influencing of the holding pressure can for example be advantageous in the holding pressure phase.

The method according to the invention makes it possible to determine an actual switch-over filling volume $\Delta V_{rXfrL}$ in a learning cycle L of the injection molding machine, wherein a switch-over to the holding pressure phase occurs in this learning cycle L when reaching the actual switch-over filling volume $\Delta V_{rXfrL}$. Such an actual switch-over filling volume $\Delta V_{rXfrL}$ is calculated and stored, provided that the learning cycle L has resulted in a good part. For this purpose, an actual switch-over filling volume $\Delta V_{rXfrL}$ and the corresponding switch-over pressure $p_{XfrL}$ is measured in the learning process L at the switch-over point.

In addition, a theoretical reference volume $V_{tRefL}$ can be determined in the learning cycle L at a theoretical reference pressure value $p_{Ref}$. The pressure $p_{Ref}$ is preferably chosen in such a way that start-up effects, such as, e.g., the closing or a non-return valve or the like are reliably suppressed.

In the learning cycle L, the actual switch-over filling volume $\Delta V_{rXfrL}$ can then be determined in an advantageous manner from the determined values from the formula $$\Delta V_{rXfrL} = \frac{V_{tRefL}}{1 - k(p_{Ref})} - \frac{V_{tXfrL}}{1 - k(p_{XfrL})}$$

In a production cycle P downstream from the learning cycle L, a theoretical reference volume $V_{tRefP}$ is determined at the reference pressure $p_{Ref}$. In addition, a theoretical volume $V_{tPC}$ is determined in the production cycle P at a simultaneous point in time $t_c$. In the production cycle P, the actual filling volume $\Delta V_{rP}$ is then calculated from this at a point in time $t_c$ from the formula $$\Delta V_{rP} = \frac{V_{tRefP}}{1 - k(p_{Ref})} - \frac{V_{tPC}}{1 - k(p_{PC})}$$

The switch-over to the holding pressure phase in the production cycle P is initiated, when the following applies:

$$\Delta V_{rP} \geq \Delta V_{rXfrL}.$$

The method can also be used during a pressure-regulated holding pressure phase, wherein the adaptation of machine parameters for reaching an ideal actual filling volume $\Delta V_{ri}$ occurs in the holding pressure phase by adapting the holding pressure.

In the case of the method according to the invention, the movement of the injection-moldable compound into the at least one cavity of a mold advantageously occurs by means of a reciprocating screw or a piston.

For example, melts of thermoplastics or thermosetting molding compounds or silicones or varnishes are possible as injection-moldable compounds.

The method according to the invention can be further developed in a positive way, when further actions of an injection molding process, such as, e.g. the control of core pullers, the opening and closing of cascades, which are controlled as a function of the injection path, i.e. as a function of the injection volume or as a function of time, are controlled as a function of the displacement according to the determined actual filling volume $\Delta V_r$. According to the invention, machine actions, which are controlled according to theoretical variables in the prior art, such as, e.g. the screw displacement path, can now be triggered according to the actual filling volume $\Delta V_r$ of the cavity, so that a higher accuracy and reproducibility of these actions can be attained.

In a further preferred embodiment of the method according to the invention, at least the learned values for the actual switch-over filling volume $\Delta_{rXfrL}$ is transferred in the learning process L and the reference pressure $p_{Ref}$ is transferred from a first injection molding machine to a second injection molding machine, which is identical in construction or not identical in construction. According to the invention it was recognized that it is possible to attain a high component quality in response to a tool move from an injection molding machine to other injection molding machines in a simple manner with only these two values without an extensive retraction and calibration of the second injection molding machine.

BRIEF DESCRIPTION OF THE DRAWING

The invention will be explained in more detail below in an exemplary manner by means of the drawings.

DETAILED DESCRIPTION OF PREFERRED EMBODIMENTS

Figure 1A:
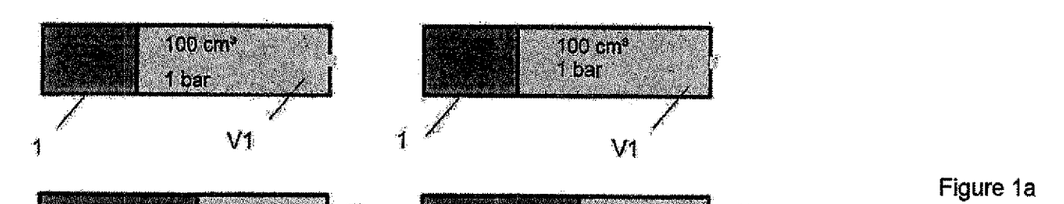
FIGS. 1a to 1c: show schematic illustrations of differences in an introduced volume of injection-moldable compound at different pressure levels (1000 bar and 500 bar)
Figure 1B:
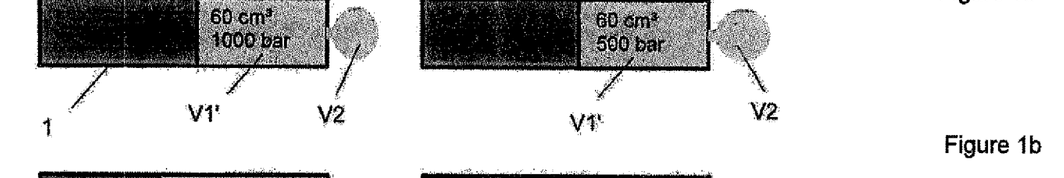
Figure 1C:
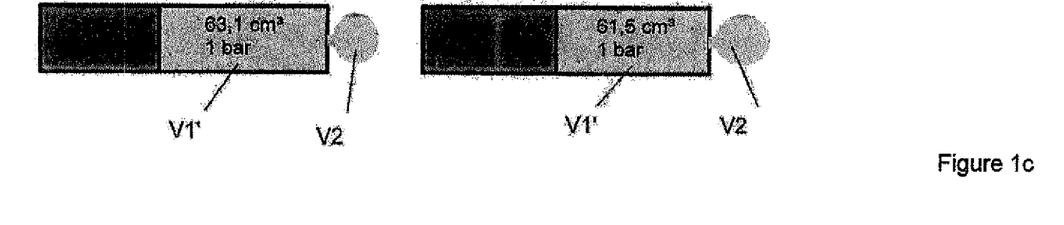

FIGS. 1a to 1c show schematic illustrations of injection aggregates 1 and a melting volume $V_1$ of 100 cm³ at 1 bar (ambient pressure) in a highly schematized manner. This is an initial state.

In FIG. 1b, the melting volume $V_1$ is reduced to 60 cm³ in a screw antechamber in a first case and is at a pressure of 1000 bar. A second volume $V_2$ is located in a non-illustrated cavity of a mold.

In the illustration on the right according to FIG. 1b, a state is shown, in which the melt volume $V_1'$ is 60 cm³ and is at a pressure of 500 bar.

In the illustration on the left in FIG. 1c, the state after FIG. 1b (left) is shown after the state according to FIG. 1b (left) was relaxed to ambient pressure. The volume $V_1'$ changes to 63.1 cm³ and is present at 1 bar of ambient pressure. The volume $V_2$ in the left illustration of FIG. 1 is 36.9 cm³ in the relaxed state. The volume $V_2$ according to the right illustration in FIG. 1c is 38.5 cm³. This means that in the case according to FIGS. 1a, 1b, 1c illustrated on the right, significantly less (1.6 cm³ less) injection-moldable compound was introduced.

The two cases, which were shown parallel next to one another in FIGS. 1a, 1b, 1c, represent the prior art, which currently does not provide to measure or to control the volume of the molding compound, which is introduced into a cavity of an injection mold in such a way that the compressibility is considered. In response to such an approach according to the prior art, a volume $V_2$ of different sizes is to be expected, when the injection-moldable compound is relaxed and when pressures of different sizes have prevailed during the injection molding process. This means that if—as practiced in the prior art—an injection molding machine is volume-controlled or, equivalently, is operated during the screw stroke and the injection molding process is thus ended at a certain theoretical volume $V_t$ or at a certain screw stroke, different molded part compounds are introduced into the cavity at different pressures.

Such pressure differences, however, appear in reality due to temperature fluctuations and viscosity changes of the material/granules/the injection-moldable compound and thus influence the component quality and the weight constancy in a disadvantages manner. Based on this knowledge, the invention will now be explained below.

A method for the compression-adjusted determination of a plastic volume $V_r$ is the core of the invention. This means, in other words, that the movement of a volume $V_r$ into a cavity occurs in consideration of the compressibility of the injection-moldable compound. A screw unit 2, which is equipped with a non-return valve, if necessary, is located in the injection unit 1 in a schematized manner (see FIGS. 2a, 2b).

Figure 2A:
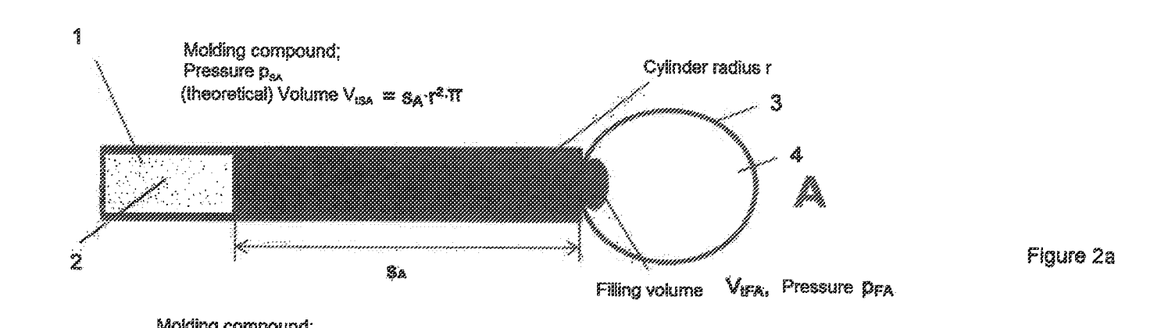
FIGS. 2a, 2b: shows two machine states A and B in the case of a screw stroke $s_A$ and $s_B$ in a highly schematized manner.
Figure 2B:
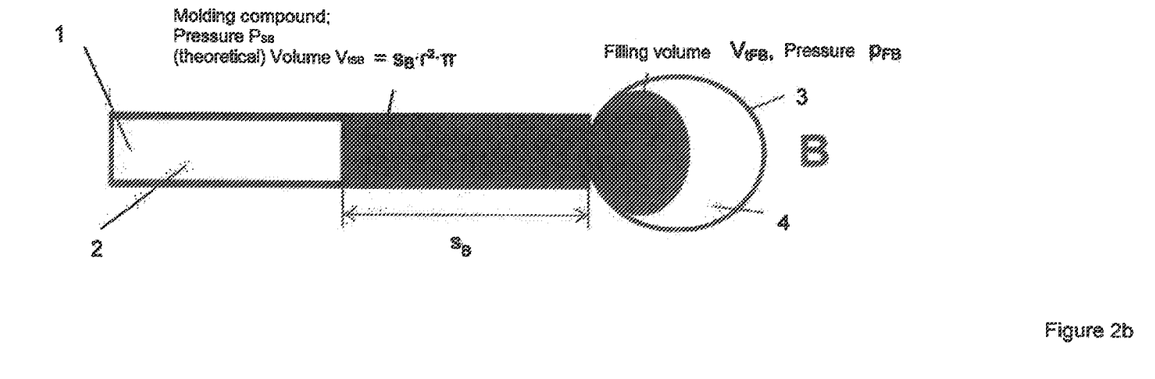

In the alternative, the screw unit 2 can also be embodied as piston.

An injection-moldable molding compound, e.g. a plastic melt or a thermosetting injection-moldable molding compound, is located upstream of the screw unit 2. This molding compound is under a pressure $p_{SA}$, when the screw unit 2 is located at a position A. The screw is then located at the position of the screw stroke $s_A$. This corresponds to a theoretical volume in the screw antechamber $V_{tSA}$. An injection mold 3 comprising a cavity 4 is also illustrated in a schematized manner.

Theoretical volume $V_{tFA}$ which is already located in the cavity 4 at an internal mold pressure $p_{FA}$, is additionally illustrated in a schematic manner (at the screw position $s_A$).

FIG. 2b shows a later state. The screw stroke $s_B$ is smaller than the screw stroke $s_A$. screw unit 2 has thus conveyed a portion of the molding compound into the cavity 4 of the mold 3. A pressure $p_{sB}$ prevails in the molding compound of the injection unit 1, in particular in the screw antechamber. A theoretical filling volume $V_{tFB}$ at the pressure $p_{FB}$ is located in the cavity 4.

The actual filling volume $\Delta V_r$ can now be determined as follows with this information. The volume $V_{tSA}$ in the screw antechamber can be measured via a position measuring system of the screw and is displayed in a machine controller. From the difference of the screw stroke $s_A-s_B$, a theoretical filling volume $V_{tSA}-V_{tSB}$, which is introduced into the mold between two positions A and B, can thus also be determined—assuming a negligible return flow in the non-return valve or at the piston. With the help of a compression source k(p), which is present for the respective molding compound material and which is stored in a machine controller, a change of the specific volume can now be considered. Values, which specify the compressibility of the material at hand, thus a change of the specific volume $V_U$, form the basis for the compression curve k(p). These compression curves k(p) can be determined from a pvT diagram (see FIGS. 3a, 3b) for the one isothermal case, in that a change of the specific volume $V_U$ is calculated at points of intersection S1-S4 of pressure lines 5 with a temperature vertical 6, based on the specific volume $V_U$ at the ambient pressure.

Figure 3A:
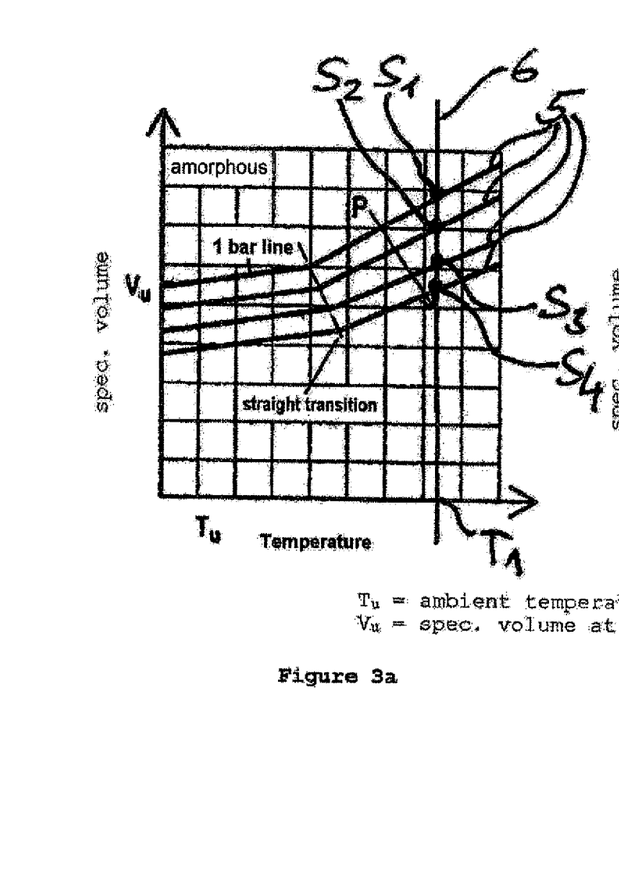
FIGS. 3a, 3b: each show a pvT diagram of amorphous (FIG. 3a) and partially crystalline (FIG. 3b) thermoplastics (source: Handbook "Injection Molding", Friedrich Johannaber, Walter Michaeli)
Figure 3B:
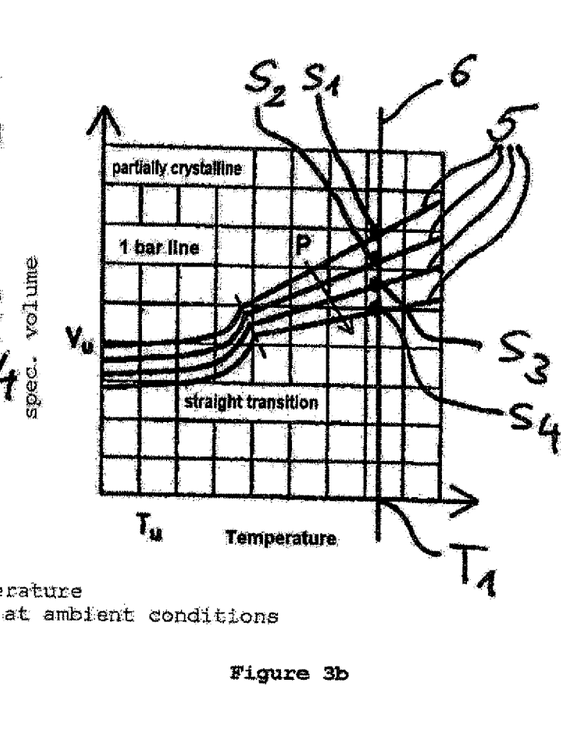

Such pressure lines 5 are specified for example in the diagrams according to FIGS. 3a, 3b for an amorphous (FIG. 3a) and partially crystalline material (FIG. 3b). At a certain temperature $T_1$, specific volumes $V_U$ of the molding compound material, which decrease as the pressure p increases, result. Points of intersection $S_1$, $S_2$, $S_3$ and $S_4$ are specified in FIGS. 3a, 3b as examples for this. The point of intersection $S_1$ specifies for example the specific volume $V_U$ of an amorphous material, when the latter is present below ambient pressure (1 bar). These points of intersection $S_2$, $S_3$ and $S_3$ in FIG. 3a specify specific volumes $V_U$ at higher pressures.

FIG. 3b shows pressure lines 5 of a partially crystalline material. The points of intersection $S_1$ to $S_4$ are located on the vertical temperature line 6, which belongs to a certain temperature $T_1$.

Figure 4:
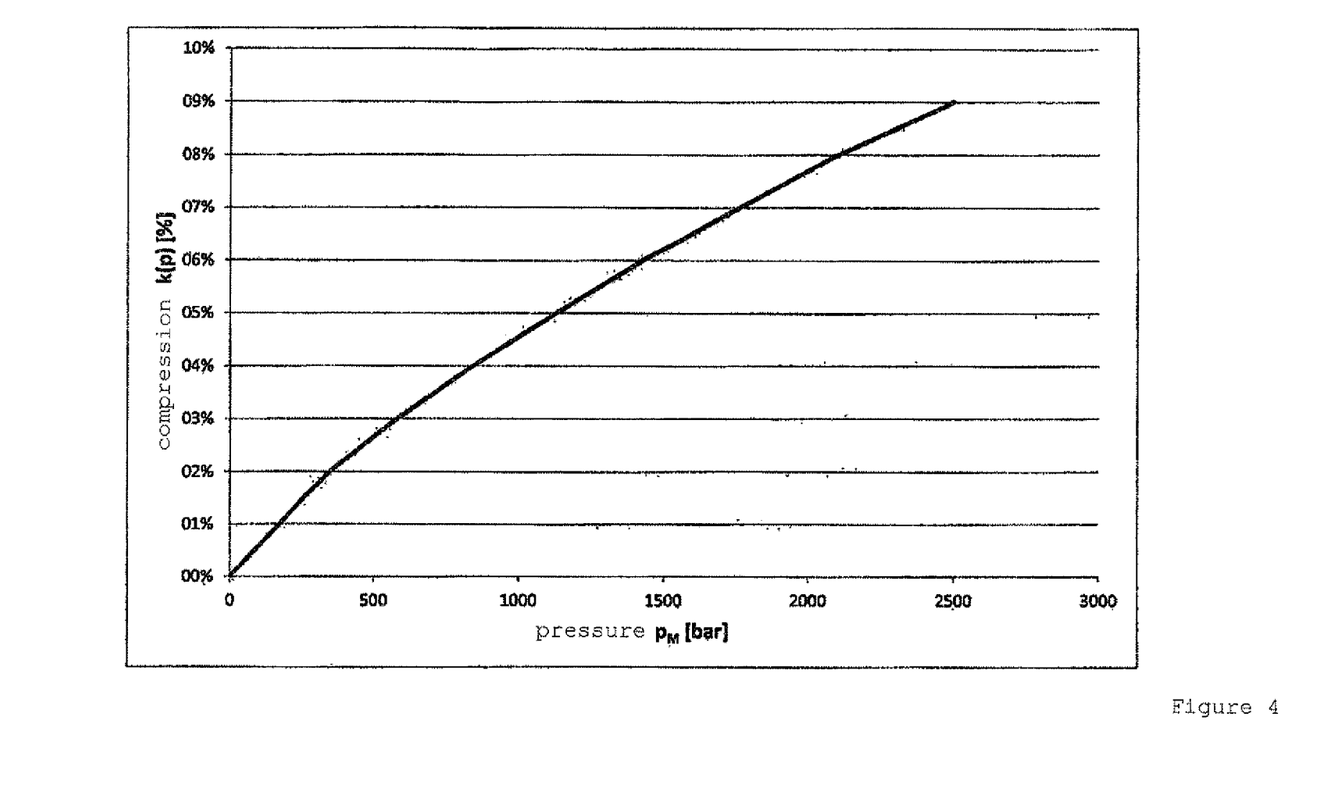
FIG. 4: shows a compression curve k(p) (adiabatic) for a thermoplastic plastic (PA6 GF30)

FIG. 4 shows a different (adiabatic) compression curve k(p). Such an adiabatic compression curve k(p) is preferred for the injection molding process. FIG. 4 shows a corresponding compression (k(p)) in percent as a function of pressure, in particular of the molding compound pressure $p_M$. Value pairs p and k(p), which form this curve, are stored in the machine controller. The compression curve according to FIG. 4 shows a course for an injection-moldable material PA6GF30 in an exemplary manner. To now be able to determine the actual volume $V_{rA}$ at a point in time A, the following equation can be specified with the knowledge of the compression curve k(p) of the used material:

$$V_{rA} = \frac{V_{tSA}}{1-k(p_{SA})} = \frac{s_A \cdot r^2 \cdot \pi}{1-k(p_{SA})}$$

The actual filling volume $\Delta V_r$ introduced between two points in time or positions A and B can now be specified by the following equation:

$$\Delta V_r = \frac{V_{tFB}}{1-k(p_{FB})} - \frac{V_{tFA}}{1-k(p_{FA})} = \frac{s_A \cdot r^2 \cdot \pi}{1-k(p_{SA})} - \frac{s_B \cdot r^2 \cdot \pi}{1-k(p_{SB})},$$

wherein $V_{tFA}$ and $V_{tFB}$ are theoretical volumes at the points in time or positions A and B, $k(p_{FB})$ and $k(p_{FA})$ is the compressibility of the molding compound at a pressure p at the location A and at the location B, $s_A$ and $s_B$ are the screw strokes at the positions A and B and $k(p_{SA})$ and $(p_{SB})$ are the compressibilities of the molding compound at a screw antechamber pressure at the positions A or B, respectively.

The pressure $p_F$ specifies an internal mold pressure. The pressures $p_S$ specify for example a pressure in the molding compound in the screw antechamber. Both alternatives are possible pressure types, which are suitable to be used as compound pressure $p_M$.

Based on this calculation, a compression-adjusted, that is, an actual filling volume flow $\Delta \dot{V}_r$, can also be specified between the positions A, B. For example, the following equation is suitable for this purpose:

$$\Delta \dot{V}_r = \frac{\Delta V_r}{t_B - t_A}.$$

The actual volume flow $\Delta \dot{V}_r$ can advantageously be determined as derivation of the actual filling volume $\Delta V_r$ via the time t.

Different values A, B for the compound pressure $p_M$ at the positions A, B can be measured via machine-internal measuring devices, e.g. force transducers or via the hydraulic pressure of the machine, direct and/or indirect melt pressure sensors or other measuring devices for detecting the pressure of the molding compound in the cylinder. The pressures in the mold can be measured via internal tool pressure sensors or another measuring devices to detect the pressure of the molding compound in the mold.

A consideration of the compression k(p) according to the invention of the used molding material thus makes it possible to determine the actual filling volume $\Delta V_r$ and/or an actual filling volume flow $\Delta \dot{V}_r$ during the entire filling process of the cavity 4 at every point in time and/or continuously and/or at certain points in time. The actual filling volume $\Delta V_r$ or the actual volume flow $\Delta \dot{V}_r$ can thus now be influenced with suitable control devices, which are present at the machine, for the injection movement, so that a predetermined volume flow profile is employed or can be employed.

In addition, the method according to the invention now also makes it possible to now also influence further process actions of an injection molding process, which can currently be controlled as a function of screw and/or piston stroke or the volume, respectively, or also the speed or the volume flow, via the compression-adjusted actual filling volume $\Delta V_r$ or the actual filling volume flow $\Delta \dot{V}_r$. Such actions, such as, e.g., cascade controls, embossing and/or speed profiles can advantageously be triggered with the method according to the invention with identical mold filling, thus independently from viscosity fluctuations.

Figure 5:
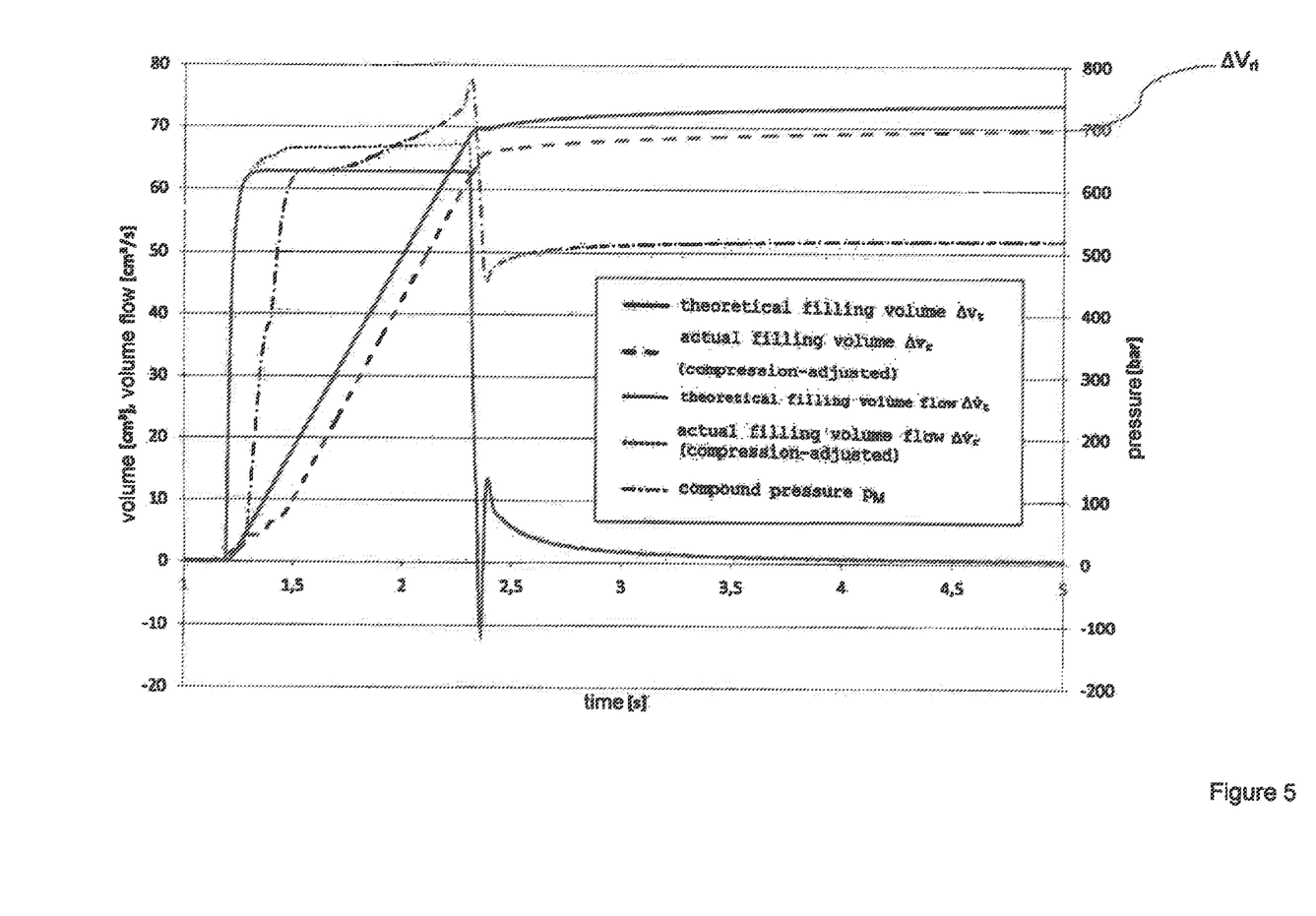
FIG. 5: shows a comparison diagram of a volume or of a volume flow, respectively, over time with curve progressions according to the prior art (non-consideration of the compressibility) and according to the invention (consideration of the compressibility, i.e. compression-adjusted).

FIG. 5 shows a comparison of different characteristic curves of an injection molding process, when such an injection molding process is performed by using the method according to the invention, as compared to an injection molding process according to the prior art.

A comparison of the curve progressions for the theoretical filling volume $\Delta V_t$ and for the actual filling volume $\Delta V_r$, which is compression-adjusted, shows that, at the time of the switch-over point, the theoretical filling volume $\Delta V_t$ has already reached a nominal filling volume of the cavity (here 70 cm³) and even exceeds this at the end of the injection molding cycle. In contrast, the actual filling volume $\Delta V_r$ reaches the nominal value of the cavity of 70 cm³ only at the end of the holding pressure phase, which corresponds to the reality. The theoretical filling volume $\Delta V_t$, which is larger than the nominal volume of the cavity at the end of the holding pressure phase, thus reflects a variable, which cannot be reproduced in reality. In the context of the present method, the nominal volume of the cavity corresponds to the ideal actual filling volume $\Delta V_{ri}$, which is to be reached.

The curve for the actual filling volume flow $\Delta \dot{V}_r$ is also arranged above the curve for the theoretical volume flow $\Delta \dot{V}_t$ in the area up to the switch-over point. These curves run approximately congruently only starting at the holding pressure phase.

What is claimed is:

1. A method for determining an actual volume $V_r$ of an injection-moldable compound during an injection molding process, comprising:
    determining a theoretical volume $V_t$ from process variables as the injection-moldable compound is introduced into a cavity of a mold during a filling phase of the injection molding process;
    determining and/or measuring at least one value for at least one compound pressure $p_M$;
    selecting a material-specific compression k(p) in correspondence to the value of the compound pressure $p_M$ of the injection-moldable compound;
    calculating an actual volume $V_r$ as a function of the material-specific compression k(p), wherein the material-specific compression k(p) of the injection-moldable compound is selected from an adiabatic compression curve k(p);

adapting machine parameters during a pressure-regulated holding pressure phase to realize an ideal actual filling volume $\Delta V_{ri}$ by adjusting a holding pressure;

determining a theoretical switch-over volume $V_{tXfrL}$ in a cycle, and switching-over to a holding pressure phase in the cycle when the theoretical switch-over volume $V_{tXfrL}$ is reached;

determining a theoretical reference volume $V_{tRefL}$ at a reference pressure value $p_{Ref}$ in the cycle;

determining in a production cycle downstream from the cycle, a theoretical reference volume $V_{tRefP}$ of the production cycle at the same reference pressure value $p_{Ref}$; and determining an actual switch-over filling volume $\Delta V_{rXfrL}$ in the cycle in accordance with the following formula:

$$\Delta V_{rXfrL} = \frac{V_{tRefL}}{1 - k(p_{Ref})} - \frac{V_{tXfrL}}{1 - k(p_{XfrL})}$$

wherein $\Delta V_{rXfrL}$ is the actual switch-over filling volume in the cycle,
$V_{tRefL}$ is the theoretical reference volume at the reference pressure $P_{Ref}$ in the cycle,
$V_{tXfrL}$ is the theoretical switch-over volume at the switch-over pressure $P_{XfrL}$ in the cycle,
$p_{Ref}$ is the reference pressure value,
$p_{XfrL}$ is the switch-over pressure in the cycle,
wherein the reference pressure value is reached at a first point in time $t_A$ and a switch-over point is reached at a second point in time $t_B$,
calculating an actual filling volume $\Delta V_{rP}$ at a third point in time $t_C$ in a production cycle downstream from the cycle in accordance with the following formula:

$$\Delta V_{rP} = \frac{V_{tRefP}}{1 - k(p_{Ref})} - \frac{V_{tPC}}{1 - k(p_{PC})}$$

wherein $\Delta V_{rP}$ is the actual filling volume in the production cycle,
$V_{tRefP}$ is the theoretical reference volume at the reference pressure value $P_{ref}$ in the production cycle,
$V_{tPC}$ is the theoretical volume at time $t_c$ at the pressure value $p_{PC}$ in the production cycle,
$p_{PC}$ is the pressure in the production cycle,
comparing the actual filling volume $\Delta V_{rP}$ with the actual switch-over filling volume $\Delta V_{rXfrL}$ for the switch-over to the holding pressure phase in the production cycle, and
initiating the switch-over to the holding pressure phase in the production cycle when $$\Delta V_{rP} \geq \Delta V_{rXfrL}.$$

2. The method of claim 1, wherein the adiabatic compression curve k(p) is stored in the machine controller.

3. The method of claim 1, wherein as the compound pressure $P_M$ a compound pressure in a cylinder or a compound pressure $P_F$ of a molding compound in an internal of the mold or a molding compound pressure $P_S$ in a screw antechamber is used, and further comprising determining and/or measuring at least two values A; B of the compound pressure $P_M$.

4. The method of claim 3, wherein at least one of the two values A; B involves average values relating to a plurality of individual measuring values.

5. The method of claim 3, wherein the actual filling volume $\Delta V_r$ corresponds to a volume, which is introduced into the mold without applied pressure, between the two values A; B and is calculated according to the formula:

$$\Delta V_r = \frac{V_{tFB}}{1 - k(p_{FB})} - \frac{V_{tFA}}{1 - k(p_{FA})} = \frac{V_{tSA}}{1 - k(p_{SA})} - \frac{V_{tSB}}{1 - k(p_{SB})}$$

wherein:

$\Delta V_r$ is the actual filling volume,
$V_{tFB}$ is the theoretical volume in the mold at position B,
$P_{FB}$ is the molding compound pressure in the mold at position B,
$V_{tFA}$ is the theoretical volume in the mold at position A,
$P_{FA}$ is the molding compound pressure in the mold at position A,
$V_{tSA}$ is the theoretical volume in an injection unit at position A,
$p_{SA}$ is the molding compound pressure in the screw antechamber at position A,
$V_{tSB}$ is the theoretical volume in an injection unit at position B, $p_{SB}$ is the pressure in the screw antechamber at position B.

6. The method of claim 1, further comprising adding a constant theoretical volume $V_t^*$ to every measured theoretical volume $V_t$ in response to the calculation of the actual filling volume $\Delta V_r$.

7. The method of claim 1, further comprising determining an actual filling volume flow $\Delta \dot{V}_r$ by deriving the actual filling volume $\Delta V_r$ or the actual volume $V_r$ over time, in accordance with the formula $$\Delta \dot{V}_r = \frac{\Delta Vr}{t_B - t_A}$$

wherein:

$\Delta \dot{V}_r$ is the actual filling volume flow,
$\Delta V_r$ is the actual filling volume,
$t_B$ is one point in time (time of value B)
$t_A$ is another point in time (time of value A).

8. The method of claim 7, further comprising determining the actual volume flow $\Delta \dot{V}_r$ as a function of a screw speed $v_s$ not using $t_A$ and $t_B$.

9. The method of claim 1, wherein at least one of the actual filling volume $\Delta V_r$ or an actual filling volume flow $\Delta \dot{V}_r$ is determined continuously during the filling phase and/or an injection movement for filling the cavity is influenced in such a way that a predetermined actual volume flow profile is employed.

10. The method of claim 1, wherein at least one of the actual filling volume $\Delta V_r$ or an actual volume flow $\Delta \dot{V}_r$ is compared during the filling phase to a reference curve of an actual filling volume $\Delta V_{rR}$ and/or of an actual volume flow $\Delta \dot{V}_{rR}$.

11. The method of claim 1, wherein the injection-moldable compound is introduced into the cavity of the mold by a reciprocating screw or a piston.

12. The method of claim 1, wherein the injection-moldable compound is a melt of thermoplastics or thermosetting molding compounds or silicones or varnishes.

13. The method of claim 1, further comprising controlling further actions of an injection molding process as a function of the actual filling volume.

14. The method of claim 1, further comprising transferring learned values for the actual switch-over filling volume $\Delta V_{rXfrL}$ in the cycle and the reference pressure $p_{Ref}$ from a first injection molding machine to a second injection molding machine, which is constructionally identical or not constructionally identical to the first injection molding machine.

\* \* \* \* \*